US009787937B1

(12) United States Patent
Hung et al.

(10) Patent No.: US 9,787,937 B1
(45) Date of Patent: Oct. 10, 2017

(54) DISPLAY APPARATUS FOR VIDEO WALL AND OPERATION METHOD THEREOF

(71) Applicant: Novatek Microelectronics Corp., Hsinchu (TW)

(72) Inventors: Chun-Wei Hung, Hsinchu (TW); Chia-Hsing Hou, Hsinchu (TW)

(73) Assignee: Novatek Microelectronics Corp., Hsinchu (TW)

(*) Notice: Subject to any disclaimer, the term of this patent is extended or adjusted under 35 U.S.C. 154(b) by 15 days.

(21) Appl. No.: 15/169,761

(22) Filed: Jun. 1, 2016

(51) Int. Cl.
*H04N 5/66* (2006.01)
*H04N 9/12* (2006.01)
*H04N 7/01* (2006.01)
*G06F 3/14* (2006.01)
*G09G 5/00* (2006.01)

(52) U.S. Cl.
CPC ......... *H04N 7/0122* (2013.01); *G06F 3/1446* (2013.01); *G09G 5/005* (2013.01); *G09G 2300/026* (2013.01); *G09G 2320/0606* (2013.01); *G09G 2340/0435* (2013.01); *G09G 2354/00* (2013.01)

(58) Field of Classification Search
USPC ...... 348/383, 404.1, 429.1, 432.1, 510, 512, 348/515, 523, 567, 706, 714, 719, 721, 348/723, 725, 731, 247, 361, 180, 173, 348/46, 68, 75; 345/1.1, 3.3, 3.1, 39, 50, 345/64, 75.2, 82, 87, 211, 156, 157, 179, 345/547; 386/332, 334, 360, 361, 362; 710/1, 2, 3, 13, 64
See application file for complete search history.

(56) References Cited

U.S. PATENT DOCUMENTS

| | | | | |
|---|---|---|---|---|
| 5,610,663 A * | 3/1997 | Nan | ...................... | G09G 1/165 345/213 |
| 6,028,643 A * | 2/2000 | Jordan | .................. | G06F 3/1431 348/552 |
| 6,285,396 B1 * | 9/2001 | Har Shoshanim | ... | H04N 17/004 348/180 |
| 2005/0246433 A1 * | 11/2005 | Carrigan | ................. | G06F 3/023 709/223 |
| 2009/0195658 A1 * | 8/2009 | Deschamp | ............. | H04N 17/04 348/184 |
| 2010/0033627 A1 * | 2/2010 | Hayashi | ................. | G09G 5/005 348/500 |

(Continued)

*Primary Examiner* — Jefferey F Harold
*Assistant Examiner* — Mustafizur Rahman
(74) *Attorney, Agent, or Firm* — Jianq Chyun IP Office

(57) ABSTRACT

A display apparatus that is suitable for a video wall and an operation method thereof are provided. The display apparatus includes a display panel, a memory circuit and a video processing circuit. The memory circuit is used for storing extended display identification data (EDID), and resolution information of the EDID may affect a resolution of a video frame signal of a video source. The video processing circuit transmits the video frame signal to a video output connector. Based on a video wall configuration parameter, the video processing circuit captures part or all of pixel data in the video frame signal to obtain a captured frame, and displays the captured frame on the display panel. Based on the video wall configuration parameter, the video processing circuit can adaptively change the resolution information of the EDID stored in the memory circuit.

13 Claims, 5 Drawing Sheets

(56) References Cited

U.S. PATENT DOCUMENTS

| | | | |
|---|---|---|---|
| 2011/0285818 A1* | 11/2011 | Park | H04N 13/0048 348/43 |
| 2012/0249736 A1* | 10/2012 | Barrett | H04N 13/0029 348/43 |
| 2013/0083167 A1* | 4/2013 | Miyauchi | H04N 5/74 348/46 |
| 2013/0314439 A1* | 11/2013 | Ota | G06T 11/60 345/629 |
| 2014/0198020 A1* | 7/2014 | Syu | G06F 3/1446 345/87 |
| 2014/0376880 A1* | 12/2014 | Oh | H04N 9/8227 386/231 |
| 2015/0347077 A1* | 12/2015 | Kataoka | G06F 3/1446 345/1.1 |

* cited by examiner

DISPLAY APPARATUS FOR VIDEO WALL AND OPERATION METHOD THEREOF

FIELD OF THE INVENTION

The invention is directed to a display apparatus and more particularly, to a display apparatus for a video wall and an operation method thereof.

DESCRIPTION OF RELATED ART

A so-called video wall generally refers to a large display wall formed by splicing a plurality of display apparatuses together. A video frame can be transmitted by a video source to the display apparatuses of the video wall. Based on a preset video wall configuration, each of the display apparatuses captures a part of subframes from the video frame and displays the same. For instance, if it is assumed that two display apparatuses are spliced to form a video wall, the left-side display apparatus is in charge of displaying the left part of the video frame, and the right-side display apparatus is in charge of displaying the right part of the video frame, such that the complete video frame can be displayed on the video wall.

However, there is no way for the video source to obtain an optimal resolution of the video wall, and as a result, the resolution of the video frame output by the video source in most occasions is different from the optimal resolution of the video wall. For instance, in the case assuming that two display apparatuses are spliced to form a video wall, and the resolution of both the two display apparatuses is 1920*1080. The left-side display apparatus is in charge of displaying the left part of the video frame, the right-side display apparatus is in charge of displaying the right part of the video frame, and the optimal resolution of the video wall should be 3840*1080. The resolution of the video frame output by the video source will be set to 1920*1080 because the video source can obtain the resolution of the display apparatus which are directly connected therewith only by means of reading extended display identification data (EDID) of the connected display apparatus. However, due to the video source incapable of obtaining a configuration state of the video wall, the resolution of the video frame output by the video source is not the optimal resolution of the video wall.

SUMMARY

The invention provides a display apparatus and an operation method thereof capable of providing resolution information of a video wall to a video source.

According to an embodiment of the invention, a display apparatus including a video input connector, a video output connector, a display panel, memory circuit and a video processing circuit. The video input connector is configured to receive a video frame signal of a video source. The memory circuit is configured to store extended display identification data (EDID), wherein resolution information of the EDID affects a resolution of the video frame signal of the video source. The video processing circuit is coupled to the video input connector, the video output connector, the memory circuit and the display panel. The video processing circuit is configured to adaptively change the resolution information of the EDID in the memory circuit based on a video wall configuration parameter.

According to an embodiment of the invention, an operation method of a display apparatus is provided. The operation method includes: storing EDID in a memory circuit, wherein resolution information of the EDID affects a resolution of a video frame signal of a video source; receiving the video frame signal of the video source through a video input connector by a video processing circuit; and adaptively changing the resolution information of the EDID in the memory circuit based on a video wall configuration parameter by the video processing circuit.

To sum up, in the display apparatus and the operation method thereof provided by the embodiments of the invention, the resolution information of the EDID in the memory circuit can be adaptively changed based on the video wall configuration parameter. In a plurality of display apparatuses of the video wall, each of the display apparatuses displays part of images of a video frame based on the video wall configuration parameter, and thereby, the complete video frame can be displayed on the video wall. Among the display apparatuses of the video wall, the display apparatus connected to the video source can adaptively change the resolution information of the EDID based on the video wall configuration parameter. Thus, the display apparatus provided by the embodiments of the invention can provide the resolution information of the video wall to the video source, such that the video source can adaptively change a resolution of the video frame signal according to the resolution information of the video wall.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
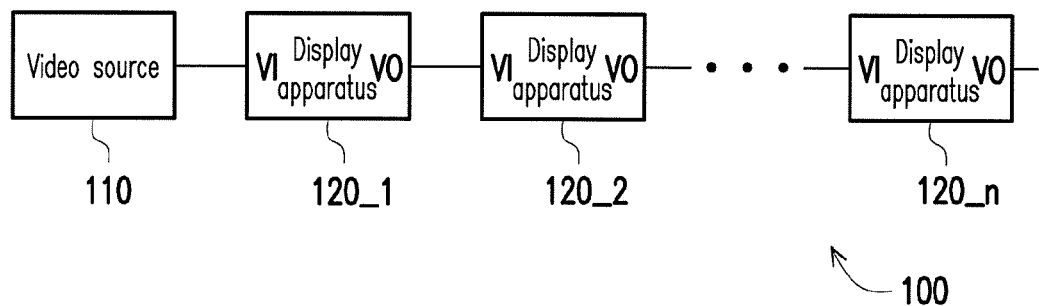
FIG. 1 is a schematic block diagram illustrating a video wall according to an embodiment of the invention.

A term "couple" used in the full text of the disclosure (including the claims) refers to any direct and indirect connections. For instance, if a first device is described to be coupled to a second device, it is interpreted as that the first device is directly coupled to the second device, or the first device is indirectly coupled to the second device through other devices or connection means. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a schematic block diagram illustrating a video wall 100 according to an embodiment of the invention. The video wall 100 includes a video source 110 and n display apparatuses (e.g., display apparatuses 120_1, 120_2, . . . and 120_n illustrated in FIG. 1). Based on a design requirement, the video source 110 is, for example, a PC host, a DVD player, an advertising/broadcasting host or other electronic apparatuses capable of providing a video. Based on the design requirement, the display apparatuses 120_1 to 120_n are, for example, liquid crystal displays (LCDs), light-emitting diode (LED) displays, field emission displays (FEDs), plasma displays, organic light emitting diode (OLED) displays or other types of display apparatuses.

The video source 110 and the display apparatuses 120_1 to 120_n are connected in series through the same video transmission interface or different video transmission interfaces. The aforementioned same video transmission interface or different video transmission interfaces include a universal serial bus (USB) connector, a thunderbolt connector, a video graphics array (VGA) connector, a digital visual interface (DVI) connector, a high definition multimedia interface (HDMI) connector, a display port (DP) connector, a mobile high-definition link (MHL) connector or any other interface circuit capable of reading extended display identification data (EDID). The EDID refers to data with respect to a screen resolution as well as a manufacturer name and a serial number. The EDID is typically stored in an electrically erasable programmable read only memory (EEPROM) or any other non-volatile memory (NVM) of a display.

Each of the display apparatuses 120_1 to 120_n has a video input connector VI and a video output connector VO. Based on the design requirement, the video input connector VI includes a USB connector, a thunderbolt connector, a VGA connector, a DVI connector, an HDMI connector, a DP connector, an MHL connector or any other interface capable of reading the EDID, and the video output connector VO includes a USB connector, a thunderbolt connector, a VGA connector, a DVI connector, an HDMI connector, a DP connector, an MHL connector or any other interface capable of transmitting a video frame signal. The video input connector VI of the first display apparatus 120_1 of the video wall 100 is connected to an output terminal of the video source 110 to receive a video frame signal. The video output connector VO of the display apparatus 120_1 is connected to a video input connector VI of the second display apparatus 120_2 to transmit the video frame signal to the display apparatus 120_2. The rest of the display apparatuses (e.g., the display apparatus 120_n) of the video wall 100 may be inferred with reference to the descriptions with respect to the display apparatus 120_1 and the display apparatus 120_2 and thus, will not be repeated.

Figure 2:
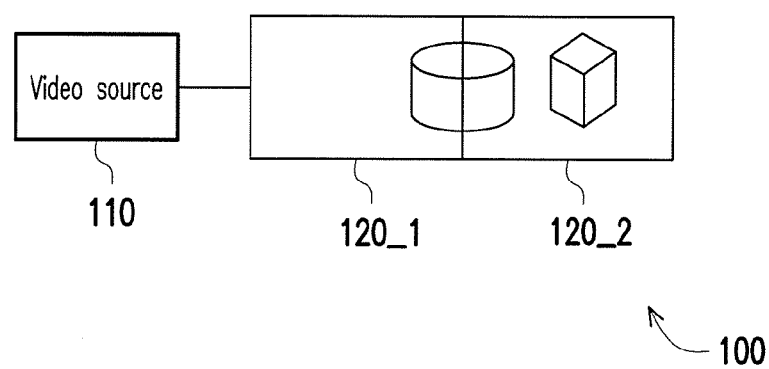
FIG. 2 is a schematic diagram illustrating an application scenario of the video wall depicted in FIG. 1.

The display apparatuses 120_1 to 120_n are spliced together to form a large display wall. Based on a preset video wall configuration, the display apparatuses 120_1 to 120_n captures part of subframes from the video frame signal provided by the video source 110 and displays the same. For instance, FIG. 2 is a schematic diagram illustrating an application scenario of the video wall 100 depicted in FIG. 1. In the example illustrated in FIG. 2, the video wall 100 has two display apparatuses 120_1 and 120_2. The two display apparatuses 120_1 and 120_2 are spliced as a 2*1 video wall. Referring to FIG. 2, based on a preset video wall configuration, the left display apparatus 120_1 may capture a left-part subframe from the video frame signal provided by the video source 110 and display the same. The display apparatus 120_1 may also copy the video frame signal provided by the video source 110 to the display apparatus 120_2. Based on the preset video wall configuration, the right display apparatus 120_2 may capture a right-part subframe from the video frame signal and display the same. Thus, the complete video frame may be displayed on the video wall 100 forming by splicing the two display apparatuses 120_1 and 120_2, as illustrated in FIG. 2.

Figure 3:
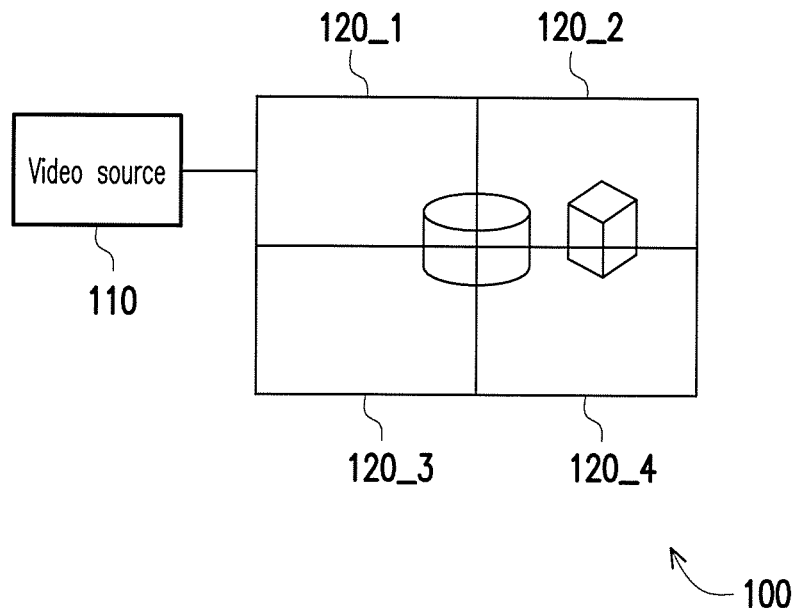
FIG. 3 is a schematic diagram illustrating another application scenario of the video wall depicted in FIG. 1.

FIG. 3 is a schematic diagram illustrating another application scenario of the video wall 100 depicted in FIG. 1. In the example illustrated in FIG. 3, the video wall 100 has four display apparatuses 120_1, 120_2, 120_3 and 120_4. The four display apparatuses 120_1 to 120_4 are spliced to form a 2*2 video wall, as illustrated in FIG. 3. Based on a preset video wall configuration, the upper left display apparatus 120_1 may capture an upper left part subframe from the video frame signal provided by the video source 110 and display the same. The display apparatus 120_1 may also copy the video frame signal provided by the video source 110 to the display apparatus 120_2. Based on the preset video wall configuration, the upper right display apparatus 120_2 may capture an upper right subframe from the video frame signal and display the same. The display apparatus 120_2 may also copy the video frame signal to the display apparatus 120_3. Based on the preset video wall configuration, the lower left display apparatus 120_3 may capture a lower left subframe from the video frame signal and display the same. The display apparatus 120_3 may also copy the video frame signal to the display apparatus 120_4. Based on the preset video wall configuration, the lower right display apparatus 120_4 may capture a lower right subframe from the video frame signal and display the same. Thus, the complete video frame may be displayed on the video wall 100 formed by splicing the four display apparatuses 120_1 to 120_4, as illustrated in FIG. 3.

Figure 4:
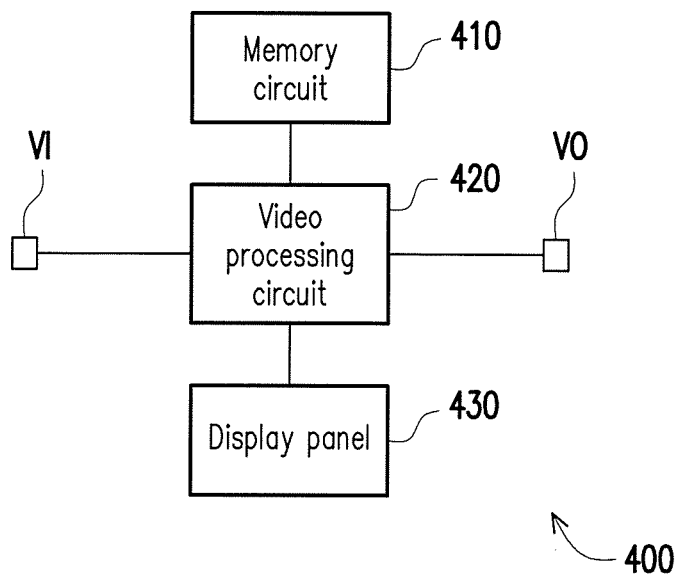
FIG. 4 is a schematic circuit block diagram illustrating a display apparatus according to an embodiment of the invention.

FIG. 4 is a schematic circuit block diagram illustrating a display apparatus 400 according to an embodiment of the invention. Description related to the display apparatus 400 illustrated in FIG. 4 may be applied to any one of the display apparatuses 120_1 to 120_n illustrated in FIG. 1 to FIG. 3. Referring to FIG. 4, the display apparatus 400 includes a video input connector VI, a video output connector VO, a memory circuit 410, a video processing circuit 420 and a display panel 430. The video input connector VI is configured to receive a video frame signal of the video source 110. The video processing circuit 420 is coupled to the video input connector VI and the video output connector VO. The video processing circuit 420 is configured to copy/transmit the video frame signal of the video input connector VI to the video output connector VO.

The memory circuit 410 is configured to store EDID. Based on a design requirement, the memory circuit 410 may be a volatile memory, a non-volatile memory or a hard disk drive (HDD). If it is assumed that the display apparatus 400 is the first display apparatus 120_1 illustrated in FIG. 1, the video source 110 may read the EDID stored in the memory circuit 410 through the video input connector VI of the display apparatus 400 (i.e., the first display apparatus 120_1). The video source 110 may adaptively set/change a resolution of the video frame signal according to resolution information of the EDID of the display apparatus 400 (i.e., the first display apparatus 120_1). Thus, in a case that the display apparatus 400 is the first display apparatus 120_1 illustrated in FIG. 1, the resolution information of the EDID stored in the memory circuit 410 may affect the resolution of the video frame signal of the video source 110.

The video processing circuit 420 may be a central processing unit (CPU), a microprocessor, a digital signal processor (DSP) or any other processing/control circuit. The video processing circuit 420 is further coupled to the memory circuit 410 and the display panel 430. The video processing circuit 420 may capture part or all of pixel data from the video frame signal of the video input connector VI based on a video wall configuration parameter to obtain a captured frame and then display the captured frame on the display panel 430 (which may refer to the detailed descriptions related to FIG. 2 FIG. 3). The display panel 430 is, for example, an LCD panel, a plasma display panel, an OLED display panel, an LED display panel or any other display panel. Based on the design requirement, operation details with respect to "capturing the part or all of pixel data" and "displaying the captured frame" may be a conventional technique or other techniques for video walls and thus, will not be repeated.

Based on the video wall configuration parameter, the video processing circuit 420 may also adaptively change the resolution information of the EDID in the memory circuit 410. For instance, when the video processing circuit 420 determines that the display apparatus 400 is not the first display apparatus 120_1 of the video wall 100 illustrated in FIG. 1 based on the video wall configuration parameter, the video processing circuit 420 may reset the resolution information of the EDID in the memory circuit 410 as a default resolution adapted to the display panel 430. When the video processing circuit 420 determines that the display apparatus 400 is the first display apparatus 120_1 of the video wall 100 illustrated in FIG. 1 based on the video wall configuration parameter, the video processing circuit 420 may set the resolution information of the EDID in the memory circuit 410 as video wall resolution adapted to the video wall 100 based on the video wall configuration parameter. Therein, the video wall resolution is greater than the default resolution.

Taking the scenario illustrated in FIG. 2 for example, the video processing circuit 420 may determine that the display apparatus 400 is the first display apparatus 120_1 of the video wall 100 illustrated in FIG. 2 based on a predetermined video wall configuration parameter and may obtain that the video wall 100 is a 2*1 video wall based on the video wall configuration parameter. It is assumed that the resolution of both the two display apparatuses 120_1 and 120_2 illustrated in FIG. 2 is 1920*1080. The video processing circuit 420 may set the resolution information of the EDID in the memory circuit 410 as a video wall resolution, which is 3840*1080, adapted to the video wall 100 (instead of the default resolution of 1920*1080 of the display panel 430 itself) based on the video wall configuration parameter. The video source 110 may read the EDID from the display apparatus 120_1 (i.e., the display apparatus 400) which is connected therewith to obtain that the video wall resolution of the video wall 100 in this case is 3840*1080. Because the video source 110 is capable of obtaining that the optimal resolution of the video wall 100 is 3840*1080, the video source 110 may output the video frame signal with the resolution of 3840*1080 to the two display apparatuses 120_1 and 120_2 of the video wall 100.

Taking the scenario illustrated in FIG. 3 for example, the video processing circuit 420 may determine that the display apparatus 400 is the first display apparatus 120_1 of the video wall 100 illustrated in FIG. 3 based on a predetermined video wall configuration parameter and may obtain that the video wall 100 is a 2*2 video wall based on the video wall configuration parameter. It is assumed that the resolution of all the four display apparatuses 120_1, 120_2, 120_3 and 120_4 illustrated in FIG. 3 is 1920*1080. The video processing circuit 420 may set the resolution information of the EDID in the memory circuit 410 as a video wall resolution, which is 3840*2160, adapted to the video wall 100 (instead of the default resolution of 1920*1080 of the display panel 430 itself) based on the video wall configuration parameter. The video source 110 illustrated in FIG. 3 may read the EDID from the display apparatus 120_1 (i.e., the display apparatus 400) which is connected therewith to obtain that the video wall resolution of the video wall 100 in this case is 3840*2160. Because the video source 110 is capable of obtaining that the optimal resolution of the video wall 100 is 3840*2160, the video source 110 may output the video frame signal with the resolution of 3840*2160 to the four display apparatuses 120_1 to 120_4 of the video wall 100.

Figure 5:
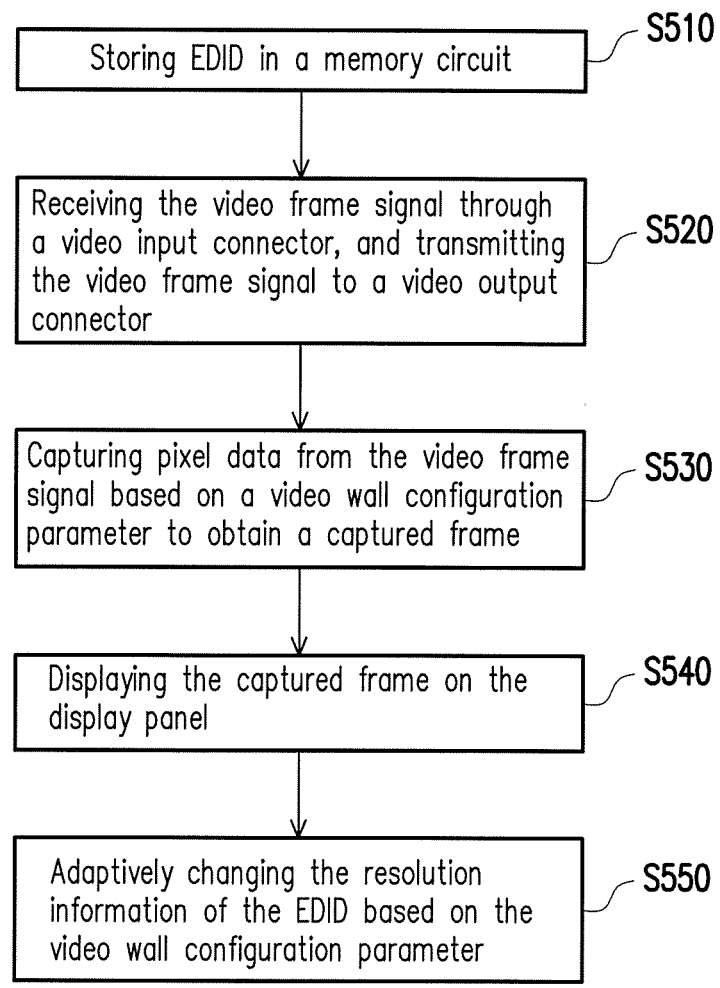
FIG. 5 is a flowchart illustrating an operation method of a display apparatus according to an embodiment of the invention.

FIG. 5 is a flowchart illustrating an operation method of a display apparatus according to an embodiment of the invention. In step S510, the EDID of the display apparatus 400 is stored in the memory circuit 410. Referring to the description related to FIG. 4, when the display apparatus 400 is the first display apparatus 120_1 of the video wall 100 illustrated in FIG. 1, the resolution information of the EDID of the display apparatus 400 may affect the resolution of the video frame signal of the video source 110. In step S520, the video processing circuit 420 may receive the video frame signal of the video source 110 through the video input connector VI and transmit the video frame signal to the video output connector VO. In step S530, the video processing circuit 420 may capture part or all of the pixel data from the video frame signal based on the video wall configuration parameter to obtain the captured frame. In step S540, the video processing circuit 420 may display the captured frame on the display panel 430. In step S550, the video processing circuit 420 may adaptively change the resolution information of the EDID in the memory circuit 410 based on the video wall configuration parameter.

Figure 6:
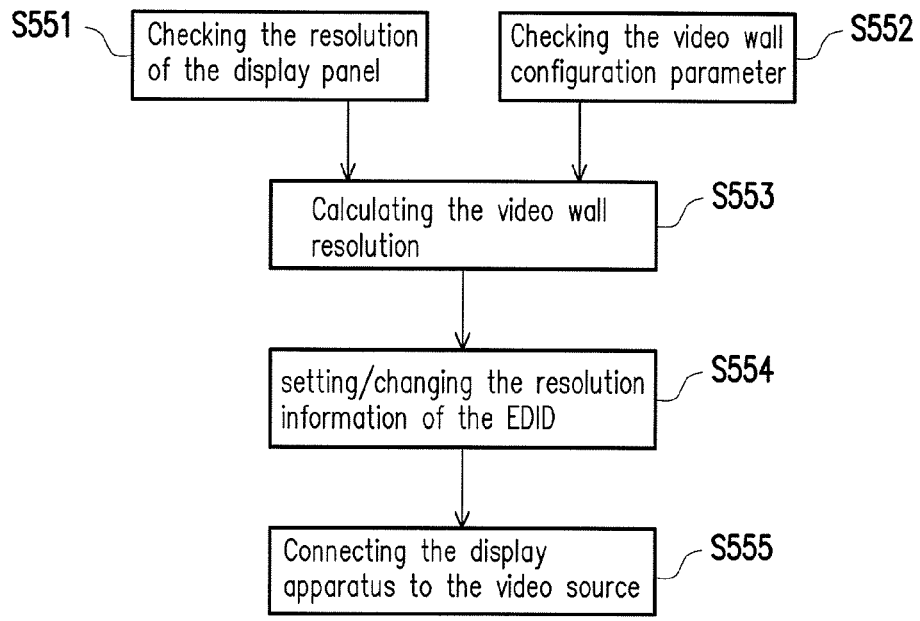
FIG. 6 is a flowchart of step S550 depicted in FIG. 5 according to an embodiment of the invention.

FIG. 6 is a flowchart of step S550 depicted in FIG. 5 according to an embodiment of the invention. In the embodiment illustrated in FIG. 6, step S550 includes sub steps S551 to S555. In step S551, the video processing circuit 420 may check that the display panel 430 has a resolution of $X_{430}*Y_{430}$, wherein $X_{430}$ and $Y_{430}$ are integers. Based on a design requirement, operation details of step S551 may be a conventional controlling/driving technique or other techniques for processing circuits and thus, will not be repeated. In step S552, the video processing circuit 420 may check the video wall configuration parameter to obtain which position of the video wall 100 illustrated in FIG. 1 the display apparatus 400 is currently located in, and obtain the number Nx of the display apparatuses of the video wall 100 on the X axis and the number Ny of the display apparatuses the video wall 100 on the Y axis, wherein Nx and Ny are integers. Taking the scenario illustrated in FIG. 2, the number Nx of the display apparatuses of the of the video wall 100 on the X axis is 2, and the number Ny of the display apparatuses of the of the video wall 100 on the Y axis is 1. Taking the scenario illustrated in FIG. 3, the number Nx of the display apparatuses of the of the video wall 100 on the X axis is 2, and the number Ny of the display apparatuses of the of the video wall 100 on the Y axis is 2. The mechanism of setting the "video wall configuration parameter" is not particularly limited in the present embodiment and may be determined based on design requirements. In some embodiments, the mechanism of setting the "video wall configuration parameter" may refer to description related to FIG. 7 below. In some other embodiments, the mechanism of setting the "video wall configuration parameter" may refer to descriptions related to FIG. 8 and FIG. 9 below.

Referring to FIG. 6, in step S553, the video processing circuit 420 may calculate the video wall resolution $X_{100}*Y_{100}$ of the video wall 100, wherein $X_{100}$ and $Y_{100}$ are integers. For example, the video processing circuit 420 may calculate $X_{100}=X_{430}*Nx$ and $Y_{100}=Y_{430}*Ny$ to obtain the video wall resolution $X_{100}*Y_{100}$ of the video wall 100. When the video processing circuit 420 determines that the display apparatus 400 is not the first display apparatus 120_1 of the video wall 100 based on the video wall configuration parameter, the video processing circuit 420, in step S554, may reset the resolution information of the EDID in the memory circuit 410 as a default resolution (e.g., $X_{430}*Y_{430}$) adapted to the display panel 430. When the video processing circuit 420 determines that the display apparatus 400 is the first display apparatus 120_1 of the video wall 100 based on the video wall configuration parameter, the video processing circuit 420, in step S554, may set the resolution information of the EDID in the memory circuit 410 as the video wall resolution (which is $X_{100}*Y_{100}$, for example, wherein $X_{100}=X_{430}*Nx$, and $Y_{100}=Y_{430}*Ny$) adapted to the video wall 100 based on the video wall configuration parameter. In step S555, the display apparatus 400 may be connected to the video source 110. When the video source 110 is connected to the display apparatus 400, the video source 110 may read the resolution information of the EDID in the memory circuit 410 to obtain the video wall resolution of the video wall 100.

Figure 7:
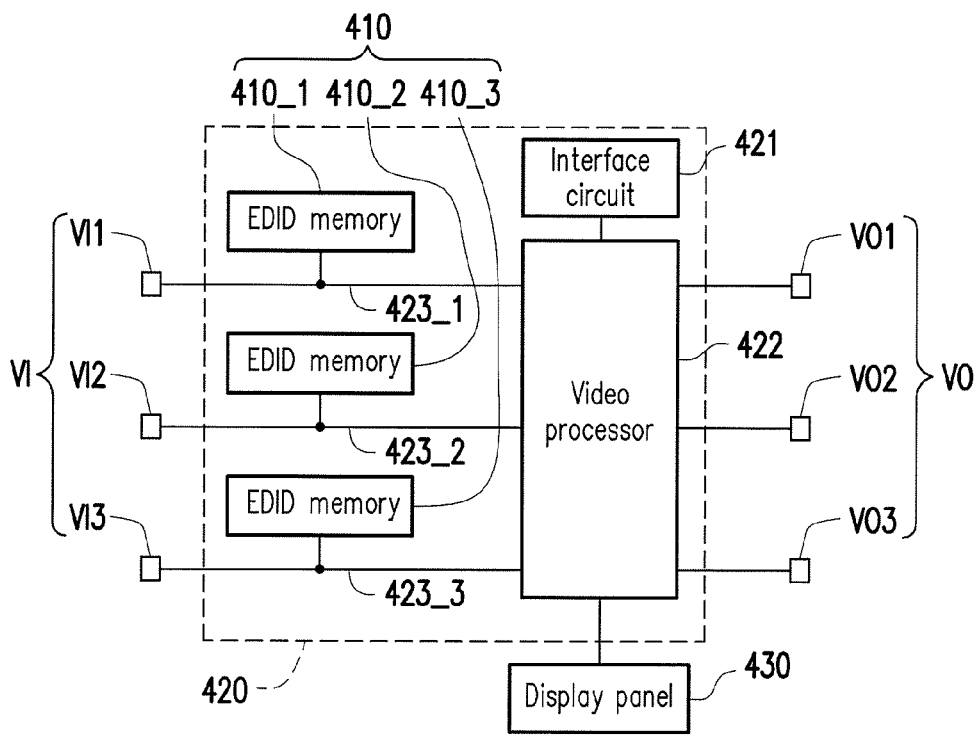
FIG. 7 is a schematic circuit block diagram of the video processing circuit depicted in FIG. 4 according to an embodiment of the invention.

FIG. 7 is a schematic circuit block diagram of the video processing circuit 420 depicted in FIG. 4 according to an embodiment of the invention. The embodiment illustrated in FIG. 7 may be inferred with reference to the descriptions related to FIG. 4, FIG. 5 and/or FIG. 6. In the embodiment illustrated in FIG. 7, the memory circuit 410 includes EDID memories 410_1, 410_2 and 410_3 configured to store the EDID of the display apparatus 400. The video input connector VI includes connectors VI1, VI2 and VI3. Transmission standards of the connectors VI1, VI2 and VI3 may be difference from one another. For example (not limited to), the connector VI1 may be a digital visual interface (DVI) connector, the connector VI2 may be a high definition multimedia interface (HDMI) connector, and the connector VI3 may be a display port (DP) connector. The video input connector VO includes connectors VO1, VO2 and VO3. Transmission standards of the connector VO1, VO2 and VO3 may be difference from one another. For example (not limited to), the connector VO1 may be a DVI connector, the connector VO2 may be an HDMI connector, and the connector VO3 may be a DP connector.

The video processing circuit 420 includes an interface circuit 421. The interface circuit 421 is configured to provide a user input interface for setting the video wall configuration parameter of the display apparatus 400. Based on a design requirement, the interface circuit 421 may include an on-screen display (OSD) interface circuit, a command interface of display data channel (DDC/CI) circuit or other interface circuits configured for setting the video wall configuration parameter. The OSD interface circuit and the DDC/CI circuit belong to the conventional technique and thus, will not be repeated.

The video processing circuit 420 further includes video buses 423_1, 423_2 and 423_3. The video bus 423_1 is coupled to the connector VI1 and the EDID memory 410_1. When the video source 110 is connected to the connector VI1, the video source 110 may read the resolution information of the EDID in the EDID memory 410_1 through the connector VI1 and the video bus 423_1. The video bus 423_2 is coupled to the connector VI2 and the EDID memory 410_2. When the video source 110 is connected to the connector VI2, the video source 110 may read the resolution information of the EDID in the EDID memory 410_2 through the connector VI2 and the video bus 423_2. The video bus 423_3 is coupled to the connector VI3 and the EDID memory 410_3. When the video source 110 is connected to the connector VI3, the video source 110 may read the resolution information of the EDID in the EDID memory 410_3 through the connector VI3 and the video bus 423_3.

The video processing circuit 420 further includes a video processor 422. The video processor 422 is coupled to the video bus 423_1, the video bus 423_2, the video bus 423_3, the interface circuit 421, the connector VO1, the connector VO2, the connector VO3 and the display panel 430. The video processor 422 may receive the video frame signal through the video input connector VI (e.g., the connector VI1, VI2 or VI3) and the video bus (e.g., the video bus 423_1, 423_2 or 423_3) and transmit the video frame signal to the video output connector VO (e.g., the connector VO1, VO2 or VO3). Based on the video wall configuration parameter set by the interface circuit 421, the video processor 422 may capture part or all of the pixel data from the video frame signal to obtain the captured frame and then, display the captured frame on the display panel 430. Based on the video wall configuration parameter set by the interface circuit 421, the video processor 422 may also adaptively change the resolution information of the EDID in the EDID memory 410_1, the EDID memory 410_2 and/or the EDID memory 410_3.

When the video processor 422 determines that the display apparatus 400 is not the first display apparatus 120_1 of the video wall 100 based on the video wall configuration parameter set by the interface circuit 421, the video processor 422 may reset the resolution information of the EDID in the EDID memory 410_1, the EDID memory 410_2 and/or the EDID memory 410_3 as the default resolution adapted to the display panel 430. When the video processor 422 determines that the display apparatus 400 is the first display apparatus 120_1 of the video wall 100 based on the video wall configuration parameter set by the interface circuit 421, the video processor 422 may set the resolution information of the EDID in the EDID memory 410_1, the EDID memory 410_2 and/or the EDID memory 410_3 as the video wall resolution adapted to the video wall 100 based on the video wall configuration parameter set by the interface circuit 421. Therein, the video wall resolution is greater than the default resolution of the display panel 430.

Figure 8:
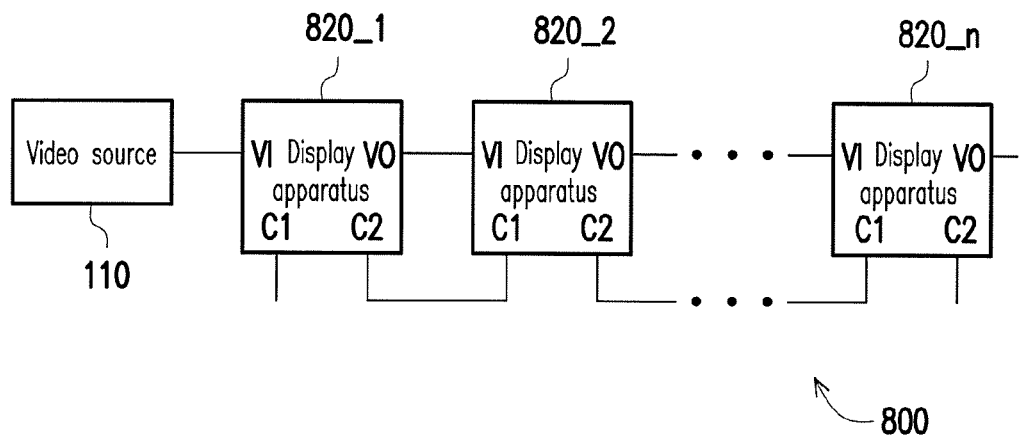
FIG. 8 is a schematic block diagram illustrating a video wall according to another embodiment of the invention.

FIG. 8 is a schematic block diagram illustrating a video wall 800 according to another embodiment of the invention. The video wall 800 includes a video source 110 and n display apparatuses (e.g., display apparatuses 820_1, 820_2, . . . and 820_n illustrated in FIG. 8). The video source 110 and the display apparatuses 820_1 to 820_n illustrated in FIG. 8 may be inferred with reference to the descriptions related to the video source 110 and the display apparatuses 120_1 to 120_n illustrated on FIG. 1, FIG. 2 and/or FIG. 3 and thus, will not be repeated. In the embodiment illustrated in FIG. 8, the display apparatuses 120_1 to 120_n are connected in series not only through the video input connectors VI and the video output connectors VO but also through communication connectors C1 and communication connectors C2.

Figure 9:
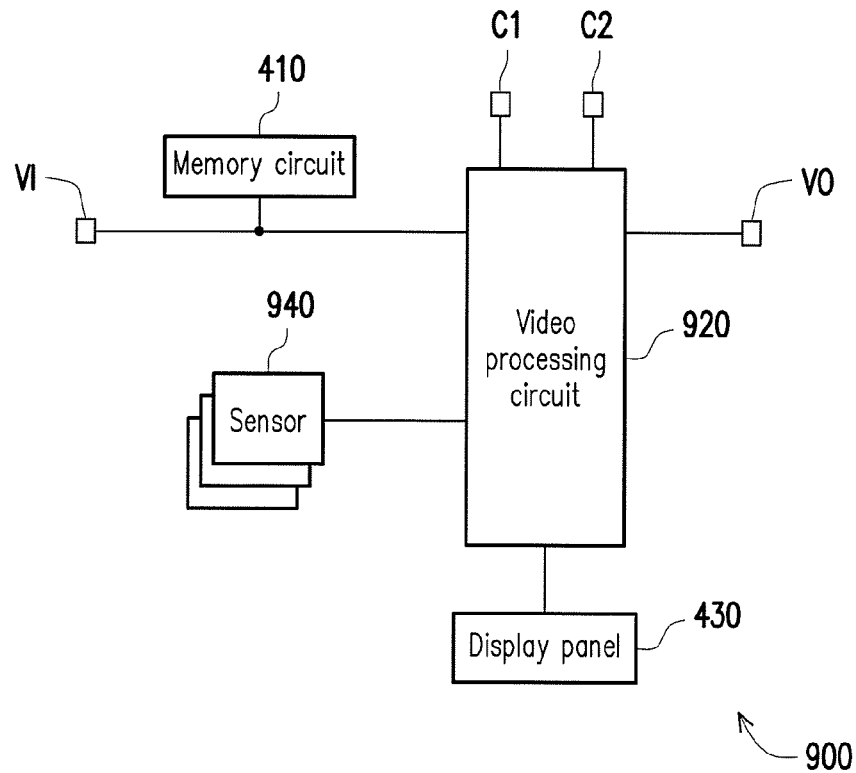
FIG. 9 is a schematic circuit block diagram illustrating a display apparatus according to an embodiment of the invention.

FIG. 9 is a schematic circuit block diagram illustrating a display apparatus 900 according to an embodiment of the invention. Description related to the display apparatus 900 illustrated in FIG. 9 may be applied to any one of the display apparatuses 820_1 to 820_n illustrated in FIG. 8. Referring to FIG. 9, the display apparatus 900 includes a video input connector VI, a video output connector VO, a memory circuit 410, a video processing circuit 920 and a display panel 430. The video input connector VI, the video output connector VO, the memory circuit 410, the video processing circuit 920 and the display panel 430 illustrated in FIG. 9 may be inferred with reference to the descriptions related to the video input connector VI, the video output connector VO, the memory circuit 410, the video processing circuit 420 and the display panel 430 illustrated in FIG. 4, FIG. 5, FIG. 6 and/or FIG. 7 and thus, will not be repeated.

Referring to FIG. 9, the display apparatus 900 further includes a communication connector C1 and a communication connector C2. The communication connector C1 and the communication connector C2 are coupled to the video processing circuit 920. The communication connector C1 and the communication connector C2 may be connected with the other display apparatuses of the video wall 800, as illustrated in FIG. 8. Based on a design requirement, the communication connector C1 and/or the communication connector C2 may include an AUX channel connector, a universal asynchronous receiver-transmitter (UART) connector, an inter-integrated ($I^2C$) connector or other communication connectors. The AUX channel connector, the UART connector and the $I^2C$ connector belong to the conventional technique and thus, will not be repeated. The video processing circuit 920 may communicate with the other display apparatus(es) of the video wall 800 through the communication connector C1 and/or the communication connector C2, so as to obtain the number of the display apparatuses of the video wall 800.

The display apparatus 900 also includes one or more sensors 940. The sensors 940 are coupled to the video processing circuit 920. Based on the design requirement, the sensors 940 may be disposed at any part of the display apparatus 900. For example (but not limited to), the number of the sensors 940 may be four, and the four sensors are respectively disposed at four edges of the display apparatus 900. The video processing circuit 920 obtains a position of the display apparatus in the video wall through the sensor 940. The video wall configuration parameter includes the number of the display apparatuses (obtained according to the communication through the communication connector C1 and/or the communication connector C2) and the position (obtained according to the sensing of the sensor 940).

The description related to the display apparatus 900 illustrated in FIG. 9 is applied to each of the display apparatuses 120_1 and 120_2 illustrated in FIG. 2 hereinafter. When the sensor 940 at the right edge of the display apparatus 120_1 senses the sensor 940 at the left edge of the display apparatus 120_2, the video processing circuit 920 of the display apparatus 120_1 may obtain that the display apparatus 120_1 is located at a left-side position on the video wall through the sensor 940.

The description related to the display apparatus 900 illustrated in FIG. 9 is applied to each of the display apparatuses 120_1 and 120_2 illustrated in FIG. 3 hereinafter. When the sensor 940 at the right edge of the display apparatus 120_1 senses the sensor 940 at the left edge of the display apparatus 120_2, and the sensor 940 at the bottom edge of the display apparatus 120_1 senses the sensor 940 at the top edge of the display apparatus 120_3, the video processing circuit 920 of the display apparatus 120_1 may obtain that the display apparatus 120_1 is located at an upper left side of the video wall through the sensor 940.

Referring to FIG. 9, when the video processing circuit 920 determines that the display apparatus 900 is not the first display apparatus 820_1 of the video wall 800 according to the position (the position is obtained according to the sensing of the sensor 940), the video processing circuit 920 resets the resolution information of the EDID in the memory circuit 410 as the default resolution adapted to the display panel 430. When the video processing circuit 920 determines that the display apparatus 900 is the first display apparatus 820_1 of the video wall 800 according to the position (obtained according to the sensing of the sensor 940), the video processing circuit 920 sets the resolution information of the EDID in the memory circuit 410 as a video wall resolution adapted to the video wall 800 according to the number of the display apparatuses (obtained according to the communication through the communication connector C1 and/or the communication connector C2). Therein, the video wall resolution of the video wall 800 is greater than the default resolution adapted to the display panel 430. The setting operation performed by the video processing circuit 920 on the EDID stored in the memory circuit 410 may refer to the setting operation performed by the video processing circuit 420 on the EDID stored in the memory circuit 410 illustrated in FIG. 2 to FIG. 7 and thus, will not be repeated.

It should be noted that in different application scenarios, the functions of the memory circuit 410, the video processing circuit 420, the EDID memory 410_1, the EDID memory 410_2, the EDID memory 410_3, the interface circuit 421, the video processor 422 and/or the video processing circuit 920 may be implemented in forms of software, firmware or hardware by employing general programming languages (e.g., C or C++), hardware description languages (e.g., Verilog HDL or VHDL) or other suitable programming languages. The software (or firmware) capable of executing the functions may be deployed in any computer-accessible media, such as magnetic tapes, semiconductor memories, magnetic disks or compact disks (e.g., CD-ROM or DVD-ROM) or may be delivered through the Internet, wired communication, wireless communication or other communication media. The software (or firmware) may be stored in the computer-accessible media for a processor of the computer to access/execute the programming codes of the software (or firmware). Moreover, the apparatus and the method of the invention may be implemented by means of a combination of hardware and software.

To summarize, in the display apparatus and the operation method thereof described in the embodiments of the invention, the resolution information of the EDID in the memory circuit can be adaptively changed based on the video wall configuration parameter. As for the plurality of display apparatuses of the video wall, each of the display apparatuses displays part of the video frame based on the video wall configuration parameter, and thereby, the complete video frame can be displayed on the video wall. Among the display apparatuses of the video wall, the display apparatus connected to the video source 110 can adaptively change the resolution information of the EDID in the memory circuit 410 based on the video wall configuration parameter. Thus, the display apparatus provided by the embodiments of the invention can provide the resolution information of the video wall to the video source 110, such that the video source 110 can adaptively adjust the resolution of the video frame signal according to the resolution information of the video wall.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A display apparatus, comprising:
a video input connector, configured to receive a video frame signal of a video source;
a video output connector;
a display panel;
a memory circuit, configured to store extended display identification data (EDID), wherein resolution information of the EDID affects a resolution of the video frame signal of the video source; and
a video processing circuit, coupled to the video input connector, the video output connector, the memory circuit and the display panel, and configured to adaptively change the resolution information of the EDID in the memory circuit based on a video wall configuration parameter,
wherein the video processing circuit resets the resolution information of the EDID in the memory circuit as a default resolution adapted to the display panel when the video processing circuit determines that the display apparatus is not a first display apparatus of a video wall based on the video wall configuration parameter, wherein a video wall resolution adapted to the video wall is greater than the default resolution.

2. The display apparatus according to claim 1, wherein the video input connector comprises a universal serial bus (USB) connector, a thunderbolt connector, a video graphics array (VGA) connector, a digital video interface (DVI) connector, a high definition multimedia interface (HDMI) connector, a display port (DP) connector or a mobile high-definition link (MHL) connector, the video output connector comprises a USB connector, a thunderbolt connector, a VGA connector, a DVI connector, an HDMI connector, a DP connector or an MHL connector.

3. The display apparatus according to claim 1, wherein when the video processing circuit determines that the display apparatus is the first display apparatus of the video wall based on the video wall configuration parameter, the video processing circuit sets the resolution information of the EDID in the memory circuit as the video wall resolution adapted to the video wall based on the video wall configuration parameter.

4. The display apparatus according to claim 1, wherein the video processing circuit transmits the video frame signal to the video output connector, captures part or all of pixel data from the video frame signal based on the video wall configuration parameter to obtain a captured frame, and display the captured frame on the display panel.

5. The display apparatus according to claim 4, wherein the memory circuit comprises an EDID memory to store the EDID, and the video processing circuit comprises:
an interface circuit, configured to provide a user input interface to set the video wall configuration parameter;
a video bus, coupled to the video input connector and the EDID memory; and a video processor, coupled to the video bus, the interface circuit, the video output connector and the display panel, and configured to receive the video frame signal through the video input connector and the video bus, transmit the video frame signal to the video output connector, capture part or all of the pixel data from the video frame signal based on the video wall configuration parameter set by the interface circuit to obtain the captured frame, display the captured frame on the display panel and adaptively change the resolution info'nation of the EDID in the EDID memory based on the video wall configuration parameter set by the interface circuit.

6. The display apparatus according to claim 1, further comprising:
a communication connector, coupled to the video processing circuit and configured to connect with the other display apparatuses of the video wall, wherein the video processing circuit obtains the number of the display apparatuses of the video wall through the communication connector; and
at least one sensor, coupled to the video processing circuit, wherein the video processing circuit obtains a position of the display apparatus in the video wall through the at least one sensor, and the number of the display apparatuses and the position are comprised in the video wall configuration parameter.

7. The display apparatus according to claim 6, wherein the communication connector comprises a AUX channel connector, a universal asynchronous receiver-transmitter (UART) connector or an internal integrated circuit ($I^2C$) connector.

8. An operation method of a display apparatus, comprising:
storing extended display identification data (EDID) in a memory circuit, wherein resolution information of the EDID affects a resolution of a video frame signal of a video source;
receiving the video frame signal of the video source through a video input connector by a video processing circuit; and
adaptively changing the resolution information of the EDID in the memory circuit based on a video wall configuration parameter by the video processing circuit, wherein the step of adaptively changing the resolution information of the EDID in the memory circuit comprises:
resetting the resolution information of the EDID in the memory circuit as a default resolution adapted to a display panel of the display apparatus by the video processing circuit when the video processing circuit determines that the display apparatus is not a first display apparatus of a video wall based on the video wall configuration parameter, wherein a video wall resolution adapted to the video wall is greater than the default resolution.

9. The operation method according to claim 8, further comprising:
transmitting the video frame signal to a video output connector by the video processing circuit;
capturing part or all of pixel data from the video frame signal based on the video wall configuration parameter to obtain a captured frame by the video processing circuit; and
displaying the captured frame on the display panel.

10. The operation method according to claim 9, wherein the video input connector comprises a USB connector, a thunderbolt connector, a VGA connector, a DVI connector, an HDMI connector, a DP connector or an MHL connector, and the video output connector comprises a USB connector, a thunderbolt connector, a VGA connector, a DVI connector, an HDMI connector, a DP connector or an MHL connector.

11. The operation method according to claim 8, wherein the step of adaptively changing the resolution information of the EDID in the memory circuit comprises:

when the video processing circuit determines that the display apparatus is the first display apparatus of the video wall based on the video wall configuration parameter, setting the resolution information of the EDID in the memory circuit as the video wall resolution adapted to the video wall by the video processing circuit based on the video wall configuration parameter.

12. The operation method according to claim 8, further comprising:

obtaining the number of the display apparatuses of the video wall through a communication connector by the video processing circuit; and obtaining a position of the display apparatus in the video wall through at least one sensor by the video processing circuit, wherein the number of the display apparatuses and the position are comprised in the video wall configuration parameter.

13. The operation method according to claim 12, wherein the communication connector comprises an AUX channel connector, an UART connector or an I$^2$C connector.

* * * * *